United States Patent [19]
Wu et al.

[11] Patent Number: 5,107,810
[45] Date of Patent: Apr. 28, 1992

[54] IMPINGEMENT COMBUSTION CHAMBER OF INTERNAL-COMBUSTION ENGINE

[75] Inventors: Yuh-Yih Wu; Pan-Shiang Hsieh, both of Hsingchu, Taiwan

[73] Assignee: Industrial Technology Research Institute, Hsingchu, Taiwan

[21] Appl. No.: 591,978

[22] Filed: Oct. 2, 1990

[51] Int. Cl.$^5$ ............................................. F02B 23/10
[52] U.S. Cl. ............................ 123/298; 123/65.0 PD; 123/661
[58] Field of Search .............. 123/73 C, 65 PD, 298, 123/303, 305, 661, 257

[56] References Cited

U.S. PATENT DOCUMENTS

| | | | |
|---|---|---|---|
| 1,189,564 | 7/1916 | Harper | 123/533 |
| 3,074,388 | 1/1963 | Kruckenberg | 123/65 PD |
| 4,920,937 | 5/1990 | Sasaki et al. | 123/298 |

*Primary Examiner*—Tony M. Argenbright
*Attorney, Agent, or Firm*—Cushman, Darby & Cushman

[57] ABSTRACT

An impingement combustion chamber internal-combustion engine comprising mainly the piston, cylinder head and fuel injection. The exhaust side of a piston crown has a block-wall facing the spray direction of a fuel injection system. The top of the block-wall closely mates with the cylinder head. In the compression stroke, the piston moves from bottom dead center to top dead center and the nozzle fuel spray is injected to the block-wall. The fuel spray then absorbs high heat at the central portion of piston head to accelerate fuel vaporization. When the block-wall closely mates with the cylinder head, producing a high squish air motion, the fuel and air mix homogeneously, therefore, the air fuel mixture near the spark plug is easy to ignite and exhaust emissions are reduced.

4 Claims, 3 Drawing Sheets

IMPINGEMENT COMBUSTION CHAMBER OF INTERNAL-COMBUSTION ENGINE

BACKGROUND OF THE INVENTION

This invention relates to a combustion chamber of an internal-combustion engine, especially to a combustion chamber of an internal-combustion engine in which the piston crown has a special block-wall.

A two-stroke engine must use a fuel injection system in order to get complete combustion of fuel and to reduce exhaust emission. The usual fuel injection two-stroke engine is shown in FIG. 1A. The fuel injection system 5 is installed just above the cylinder cover 21 of cylinder head 2. In the compression stroke, piston 1a moves up from the bottom dead center. Fuel is injected during this period. Another example is shown in FIG. 1B with the injection nozzle 5 set on the cylinder wall 3. This type is much simpler and cheaper than that shown in FIG. 1A due to the low pressure injection. However, the usual designs have the following disadvantages:

1) In FIG. 1A, the injection nozzle 5 is installed in the cylinder head 2. The injection nozzle 5 must resist high temperature and high pressure of combustion gas it therefore uses higher injection pressure to inject fuel. Consequently, the cost of this kind of injection system is high.

2) In FIG. 1B, the injection system is installed on the cylinder wall. The time from normal injection to ignition is not long enough to obtain fuel vaporization and a good fuel mixture. Some of the fuel will be pushed into the exhaust port 32 by fresh air which comes from scavenging ports 31, because the top of piston head lacks a special block-wall design. This is called a short circuit of fuel, which causes fuel waste and exhaust emission.

3) In FIG. 1B, when the fuel is injected from nozzle 5, fuel droplets will attach on the surfaces of the combustion chamber causing wall wetting resulting in high emissions caused by unburned hydrocarbon.

SUMMARY OF THE INVENTION

An object of the present invention is to provide a new combustion chamber of an internal-combustion engine. On the top of the piston crown, a special block-wall for preventing fuel flow into the exhaust port and fuel droplets from being sprayed on the surfaces of the combustion chamber during the injection process. Thus, reducing the waste of fuel and reducing air pollution.

According to the combustion chamber of internal-combustion engine of the present invention, the piston crown has a block-wall and its top is closely fitted with the cylinder head. During the compression stroke, a squish air motion will enable the fuel and air to mix homogenoeously, and increase the turbulent intensity to achieve a high combustion rate. This is another object of this invention.

The block wall enables the fuel to be sprayed with a lower pressure onto the central part of the piston crown. The temperature of the central part of the piston crown is of course very high. The block-wall keeps the fuel gathered at the combustion chamber, absorbing heat from the piston crown thereby preventing a short-circuit of fuel and cooling down of the piston temperature.

A more complete understanding of these and other features and advantages of the present invention will become apparent from a careful consideration of the following detailed description of certain embodiments illustrated in the accompanying drawings.

DETAILED DESCRIPTION OF PREFERRED EMBODIMENT

Figure 1B:
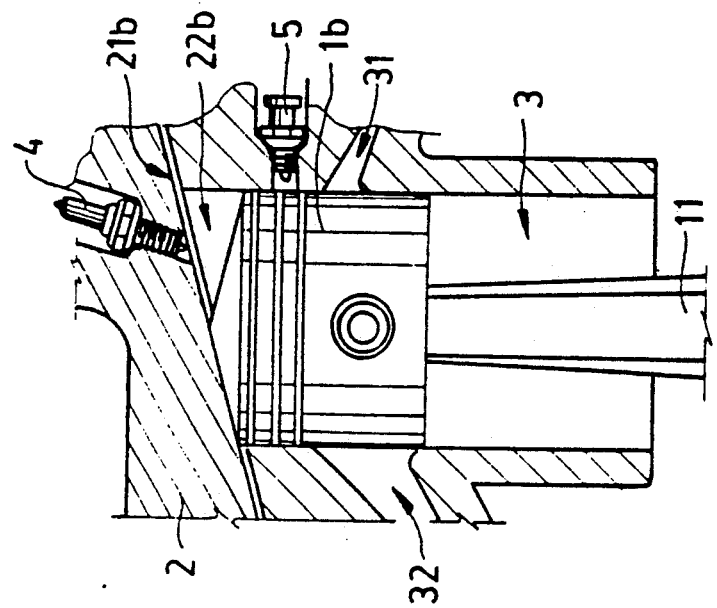
FIGS. 1A, 1B are sectional views of a cylinder of two usual two-stroke engines.
Figure 1A:
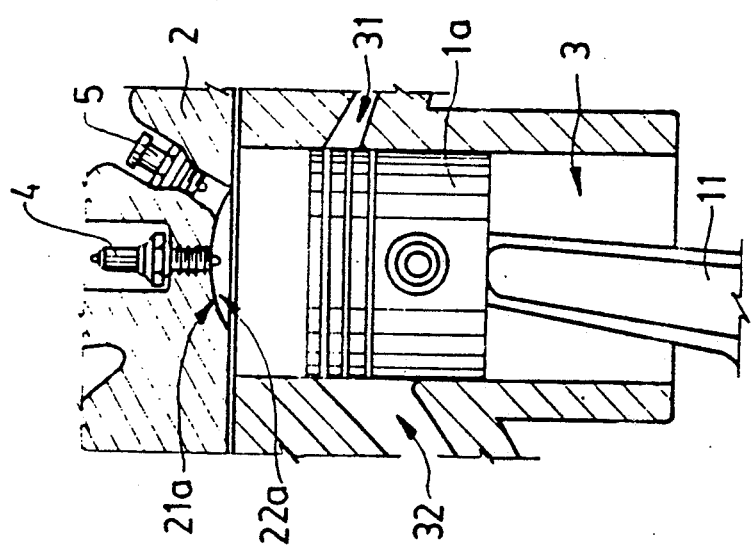

The disadvantages of traditional two-stroke engines as shown in the FIG. 1A and FIG. 1B have been described in detail in preceding paragraphs.

Figure 2:
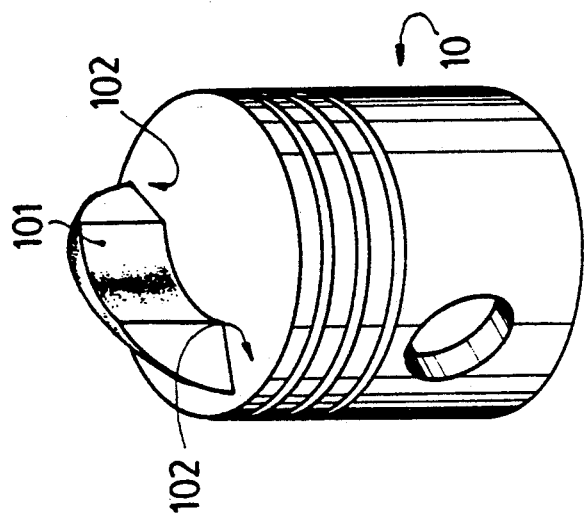
FIG. 2 shows the embodiment of the piston of the present invention.
Figure 3:
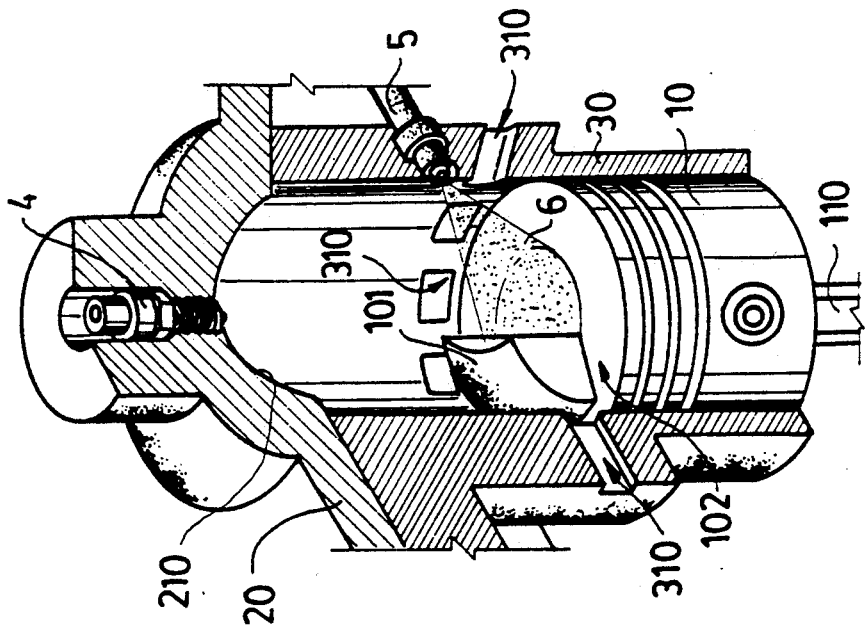
FIG. 3 is the sectional view of the cylinder of the present invention.

As shown in FIG. 2, FIG. 3 and FIG. 4, the present invention comprises mainly the cylinder 30, the piston 10, and the injection system installed on the cylinder wall. The cylinder wall includes scavenging ports 310 and exhaust port 320. The injection nozzle 5 is installed above the inlet side of scavenging ports 310. Spark plug 4 is installed in cylinder head 20. The electrode of the spark plug 4 is in the arc shaped upward concaved combustion chamber 220. A block-wall 101 is formed on the top of the piston crown 10. The block-wall 101 faces injection nozzle 5. Two sides of the block-wall can be cut as a scavenging passage 102. The face of block-wall has an arc shape. The corresponding shapes of block-wall's top and the shape of the cyliner head surface 210 mate with one another to form a squish region 7. The structure of the impingement combustion chamber of an internal-combustion engine is thus formed.

Figure 4A:
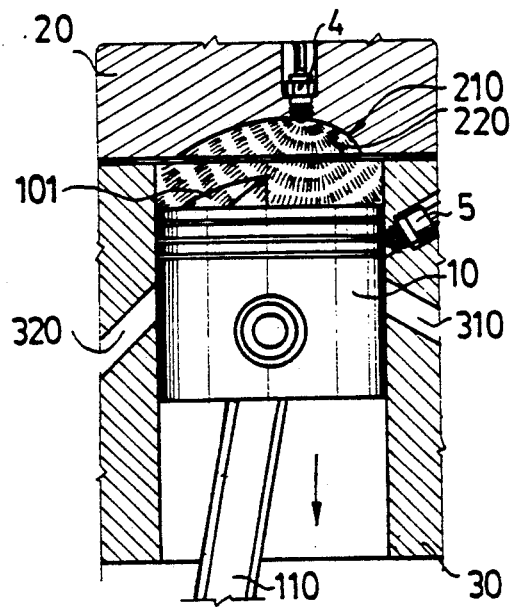
FIGS. 4A-4D are the piston stroke moving diagrams of the present invention.
Figure 4B:
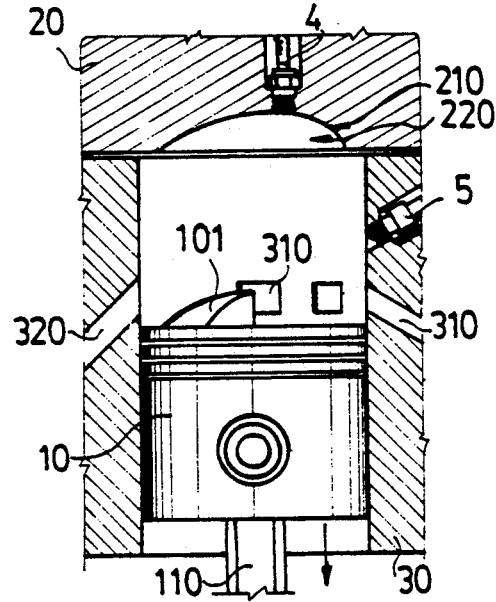
Figure 4C:
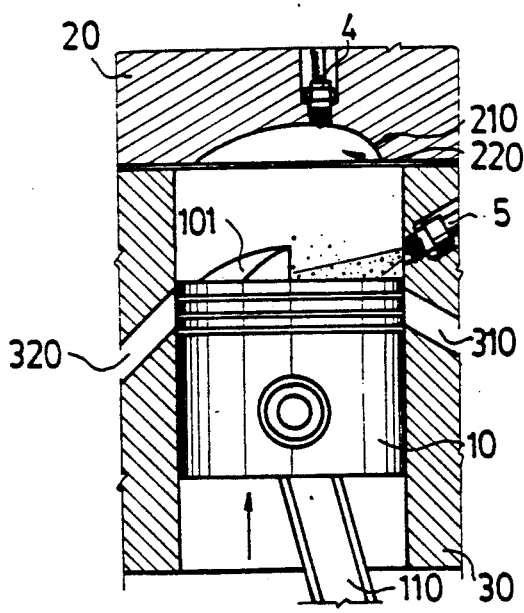
Figure 4D:
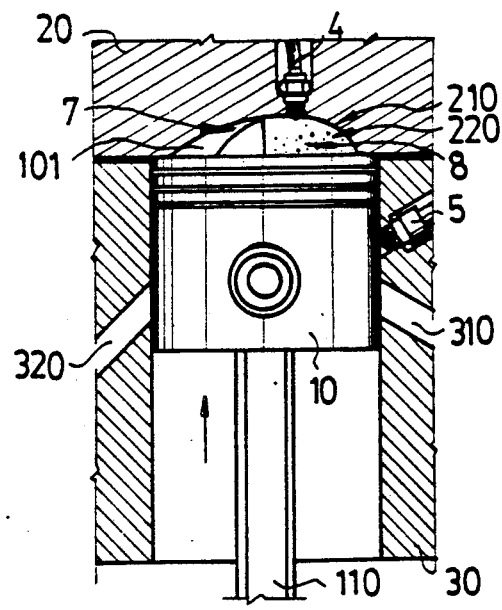

FIGS. 4A-4D show the piston at various positions during the cycle of the combustion chamber of the present invention. After the explosion (as shown in FIG. 4A) and the scavenging process (as shown in FIG. 4B), the fuel is injected from injection nozzle 5 to the central part of piston crown. The fuel spray impinges the block-wall 101 and gathers at the central part of piston crown to absorb the high temperature heat rapidly. At the same time, piston 10 continues to move upward to cover scavenging ports 310 and exhaust port 320 (as shown in FIG. 4C). Fuel droplets become vaporized by absorbing high temperature heat. When the piston 10 is held against the combustion chamber 220, the squish region 7 produces squish to achieve a good mixture of fuel and air. The air fuel mixture 8 is the ready for the next explosion process.

The advantages of the impingement combustion chamber of the present invention include:

1) A low pressure (such as 2.5 bar) and a low cost fuel injection system can be used. Furthermore, the block-wall allows the fuel to get enough heat energy for vaporization after the fuel impinges the piston crown, and there is reduced fuel short circuit through the exhaust port. The squish air motion formed by the cylinder head and the top of block wall provides a good mixture of fuel and air, and improves the combustion rate.

2) A downward fuel spray toward the central part of the piston crown can be used. Almost all of the fuel droplets, gathered within the impingement combustion chamber, vaporize rapidly. There is substantially no liquid fuel which goes to the surface of cylinder head or cylinder wall, thereby avoiding wall wetting. The hydrocarbon emission will thus be reduced tremendously.

Although the present invention has been described with a certain degree of particularity, the present disclosure has been made by way of example and changes in details of structure may be made without departing from the spirit thereof.

What is claimed:

1. An impingement combustion chamber of an internal-combustion engine, comprising:
    a cylinder having a fuel injection nozzle, scavenging ports and an exhaust port;
    a piston for compressing an air fuel mixture, said piston forming a combustion chamber with a cylinder head;
    a block-wall being formed on the top of a piston crown, said block-wall being on the exhaust side of said piston crown, said block-wall projecting outwardly on the top of said piston crown, said block-wall faces the direction of a fuel spray, the face of said block-wall being of an arc shape concave to the injection nozzle, whereby said fuel spray being injected to the central part of said piston crown, said fuel spray impinges the surfaces of said piston crown and said block-wall, the fuel spray being kept within the impingement combustion chamber and being vaporized rapidly by the high temperature of said piston crown, said block-wall prevents a fuel short-circuit through said exhaust port.

2. An impingement combustion chamber as claimed in claim 1, wherein, the corresponding shape of said block-wall top and the shape of said cylinder head surface mate with one another; at a top dead center the top of the block-wall and the surface of cylinder head form a squish region.

3. An impingement combustion chamber as claimed in claim 1, two sides of said block-wall on said piston crown being cut in a flat shape in accordance with the direction of scavenging air flow.

4. An impingement combustion chamber as claimed in claim 2, two sides of said block-wall on said piston crown being cut in a flat shape in accordance with the direction of scavenging air flow.

* * * * *